Patented Nov. 19, 1940

2,221,866

UNITED STATES PATENT OFFICE 2,221,866

PURIFICATION OF LIQUID OR LIQUEFIABLE MATERIALS DERIVED FROM COAL

Henry Dreyfus, London, England

No Drawing. Application February 26, 1938, Serial No. 192,785. In Great Britain March 5, 1937

4 Claims. (Cl. 196—14)

This invention relates to the purification of products derived from coal.

One of the impurities which is almost invariably found in products derived from coal is sulphur, and this frequently gives rise to difficulties in subsequent treatments and renders the materials unsuitable for many purposes. For example, the sulphur is often present in the form of more or less odoriferous compounds; it may also have a corrosive action on metals with which the materials may subsequently come into contact, and if the materials are subjected to a catalytic treatment it may poison the catalyst. It is thus clear that it is very desirable to remove the sulphur from such materials to as high a degree as is possible. The present invention describes a method whereby this may be done.

According to the invention liquid or liquefiable materials derived from coal are heated in a fluid phase with an oxide of aluminium or of a heavy metal or with a substance or substances capable of giving rise to such an oxide when heated.

Among the oxides which may be employed are alumina, ferric oxide, copper oxide, zinc oxide, nickel oxide, lead oxide, and molybdenum oxide. Instead of or as well as an oxide there may be employed one or more substances which give rise to an oxide, for example the carbonate of zinc or lead, a hydrated form of alumina, ferric oxide or zinc oxide, or a mixture of zinc dust and lead acetate.

It is preferable to employ the oxides in a form having a large and active surface and it is found that freshly precipitated oxides or substances capable of giving rise to oxides are of particular value in the process. The oxides are best employed in amount in excess of that theoretically required to combine with all the sulphur present in the material. For example a considerable excess, e. g. 4 times or 10 or more times the theoretical amount may be used.

Advantageously the material may be strongly heated or boiled with the oxide and it is preferable to maintain the material in the liquid form. For example it may be treated at temperatures above 150° C., e. g. at about 200° C., 300° C., 400° C. or even at a higher temperature. The pressure employed may with advantage be atmospheric or such higher pressure as may be produced under constant volume conditions by the materials undergoing treatment, but pressures in excess of this may be employed if desired.

The treatment of the materials with oxides according to the invention may be followed by any further purification step that may be desired. For example the materials may be separated from mineral matter by distillation or filtration or in any other way which suits the particular material undergoing treatment, and the materials so obtained, if desired after further refining treatment, may be employed as fuel oils. On the other hand they may be employed as raw material in the manufacture of other organic materials. For instance, they may be cracked to produce lighter oils or gases, e. g. ethylene, propylene or other olefines.

The new process is of particular value when followed by a hydrogenation step. Such a step may be carried out by heating the materials with hydrogen, preferably under relatively high pressure and in the presence of hydrogenation catalysts. For example ammonium molybdate, stannous hydroxide, or elementary nickel may be added before the hydrogenation step.

The treatment according to the invention may be applied to any liquid or liquefiable coal products, but it is of particular value when applied to compositions obtained by extracting coal with suitable solvents, e. g. hydrogenated naphthalenes, and is also useful in purifying low temperature tars and the like.

The new treatment may be the sole desulphurising treatment applied to the materials or it may follow or precede a treatment with some other desulphurising agent. For example it may follow treatment with sulphuric acid, or with caustic soda for instance as described in my U. S. application S. No. 181,714 filed 24th December, 1937, and/or after the treatment of the invention the materials may be vaporised (if of suitable boiling point) and the vapours passed with hydrogen over a mixed chromic oxide and cobalt sulphide catalyst.

The following examples illustrate without limiting the invention in any way.

Example 1

A liquid composition, obtained by extracting coal with one or more hydrogenated naphthalenes in admixture with 10% of pyridine under conditions such that between 60 and 75% of the coal is taken into solution, is washed with caustic soda solution and then heated under pressure to 250° C. with 1% of its weight of freshly precipitated hydrated alumina or ferric oxide. The aluminum or iron compounds are then removed. The extracting solvents may then be replaced by sufficient hydrocarbon oil to form a fluid mixture with the extract, and the mixture subjected to hydrogenation using stannous hydroxide as catalyst.

Example 2

A composition produced by the solvent extraction of a coal of high volatile content is washed with alkali, and then heated to 300° C. under pressure in the presence of 2% of its weight of freshly precipitated zinc hydroxide. Following the heating and after removal of the zinc compounds, the extracting solvent may be replaced by a hydrocarbon vehicle as described in my U. S. application S. No. 149,664 filed 22nd June, 1937, and the resulting composition subjected to hydrogenation.

Having described my invention, what I desire to secure by Letters Patent is:

1. Process for the production of coal substances having a reduced sulphur content, which comprises extracting part of the substance of the coal with a liquid solvent medium for coal, separating the liquid extract so produced from the undissolved residue, washing said liquid extract with an alkali solution and heating it while maintaining it in the liquid phase to a temperature above 150° C. in the presence of zinc oxide.

2. Process for the production of coal substances having a reduced sulphur content, which comprises extracting part of the substance of the coal with a liquid solvent medium for coal, separating the liquid extract so produced from the undissolved residue, washing said liquid extract with an alkali solution and heating it while maintaining it in the liquid phase to a temperature above 150° C. in the presence of ferric oxide.

3. Process for the production of coal substances having a reduced sulphur content, which comprises extracting part of the substance of the coal with a liquid solvent medium for coal, separating the liquid extract so produced from the undissolved residue, washing said liquid extract with an alkali solution and heating it while maintaining it in the liquid phase to a temperature above 150° C in the presence of a substance selected from the group consisting of alumina and oxides of heavy metals.

4. Process for the production of coal substances having a reduced sulphur content, which comprises extracting part of the substance of the coal with a liquid solvent medium for coal, separating the liquid extract so produced from the undissolved residue, washing said liquid extract with an alkali solution and heating it while maintaining it in the liquid phase to a temperature of 200 to 400° C. in the presence of a freshly precipitated substance selected from the group consisting of alumina and oxides of heavy metals.

HENRY DREYFUS.